United States Patent [19]

Kawano

[11] Patent Number: 5,166,716
[45] Date of Patent: Nov. 24, 1992

[54] ZOOM LENS CAMERA HAVING CONVERTER LENS INCORPORATED THEREIN

[75] Inventor: Kiyoshi Kawano, Tokyo, Japan
[73] Assignee: Asahi Kogaku Kogyo Kabushiki Kaisha, Tokyo, Japan
[21] Appl. No.: 451,373
[22] Filed: Dec. 15, 1989
[30] Foreign Application Priority Data Dec. 23, 1988 [JP] Japan .................. 63-325580

[51] Int. Cl.$^5$ .............................................. G03B 1/18
[52] U.S. Cl. ........................... 354/195.1; 354/195.12
[58] Field of Search ................ 354/195.1, 195.12; 350/255, 429

[56] References Cited

U.S. PATENT DOCUMENTS

| | | | |
|---|---|---|---|
| 4,154,508 | 5/1979 | Nakamura | 350/183 |
| 4,256,371 | 3/1981 | Someya | 350/429 X |
| 4,451,129 | 5/1984 | Ikari et al. | 354/195.12 |
| 4,596,449 | 6/1986 | Iwata et al. | 350/429 |
| 4,609,269 | 9/1986 | Kamata | |
| 4,887,107 | 12/1989 | Nakamura et al. | 354/195.12 |

FOREIGN PATENT DOCUMENTS 2330266 1/1975 Fed. Rep. of Germany .

OTHER PUBLICATIONS

Patent Abstracts of Japan, vol. 8, No. 211 (P-303) (1648), Oct. 26, 1984, JP-A-59 094 708.
French Search Report and Annex.

Primary Examiner—Richard A. Wintercorn
Assistant Examiner—Khanh Dang
Attorney, Agent, or Firm—Sandler, Greenblum & Bernstein

[57] ABSTRACT

A zoom lens camera in which variable power lens groups are moved in an optical axis direction of a zoom photographing optical system to vary the focal length thereof by a rotatable cam ring. A converter lens is provided to vary the focal length of the zoom photographing optical system. The cam ring is provided with a converter lens insertion hole in which the converter lens can be inserted to come into the optical axis of the zoom photographing optical system when the cam ring stops at a specific position.

6 Claims, 4 Drawing Sheets

ZOOM LENS CAMERA HAVING CONVERTER LENS INCORPORATED THEREIN

BACKGROUND OF THE INVENTION

1. Field of the Invention

The present invention relates to a zoom lens camera having therein a converter lens which varies the focal length of a zoom photographing lens.

2. Description of Related Art

Generally speaking, in a two-focus lengths lens camera having for example focal lengths of 35 mm and 70 mm, a tele converter lens is moved to come into and out of an optical axis of a photographing lens to vary the focal length. In such a two-focus lengths lens camera, it is easy to provide a lens barrel having a shape other than a circular cross section, so that the converter lens can be movably accommodated in the lens barrel. On the other hand, a zoom lens camera in which a group of magnification varying lenses (variable power lens group) is moved in the direction of the optical axis by a cam ring which rotates to vary the focal length has less freedom of design as to the shape of the lens barrel, and accordingly it is very difficult to provide a space in the cam ring for receiving the converter lens when it deviates from the optical axis. Because of this, the incorporation of the converter in the zoom lens camera has been considered impossible.

SUMMARY OF THE INVENTION

The primary object of the present invention is to provide a zoom lens camera having a converter lens incorporated therein.

The inventors of the present invention have found that if the converter lens is moved from the outside of the cam ring at a specific focal length at which the cam ring stops, the converter lens can be incorporated even in a zoom lens camera in which the zooming operation is effected by the rotation of the cam ring.

To achieve the object mentioned above, in a zoom lens camera in which variable power lens groups are moved in the optical axis direction of a zoom photographing optical system to vary the focal length thereof when a rotatable cam ring rotates, according to the present invention, the cam ring has a converter lens insertion hole in which a converter lens for varying the focal length of the zoom photographing optical system can be inserted to come into the optical axis of the zoom photographing optical system when the cam ring stops at a specific position.

In theory, the converter lens can be a front converter which comes into and out of the optical axis of the zoom photographing optical system in front of the latter, a rear converter which comes into and out of the optical axis of the zoom photographing optical system in rear of the latter, or an intermediate converter which comes into and out of the optical axis of the zoom photographing optical system between the lenses thereof. In an actual compact camera, however, a rear converter can be advantageously used, so that it is brought in rear of the zoom photographing optical system at a focal length at which the variable power lens group is in a most advanced position.

Also, in theory, the converter lens can be either a tele converter or a wide converter. However, practically, when a focal length at which the variable power lens group is located in the most advanced position is a longest focal length, a tele converter should be used. On the contrary, when the focal length at which the variable power lens groups are located in the most advanced position is a shortest focal length, a wide converter should be used.

The converter lens is supported by a converter lens frame which is preferably supported by a camera body so as to linearly move through a pinion which is driven to rotate by a motor to realize an electrically driven automatic converting operation.

Preferably, the conversion and the operation of the cam ring (i.e. zooming operation) are effected by a same single motor. The rotation of the motor can be selectively transmitted to the cam ring or the converter lens frame by a switching mechanism.

BRIEF DESCRIPTION OF THE DRAWINGS

The invention will be described below in detail with reference to the accompanying drawings, in which.

DETAILED DESCRIPTION OF PREFERRED EMBODIMENTS

Figure 1:
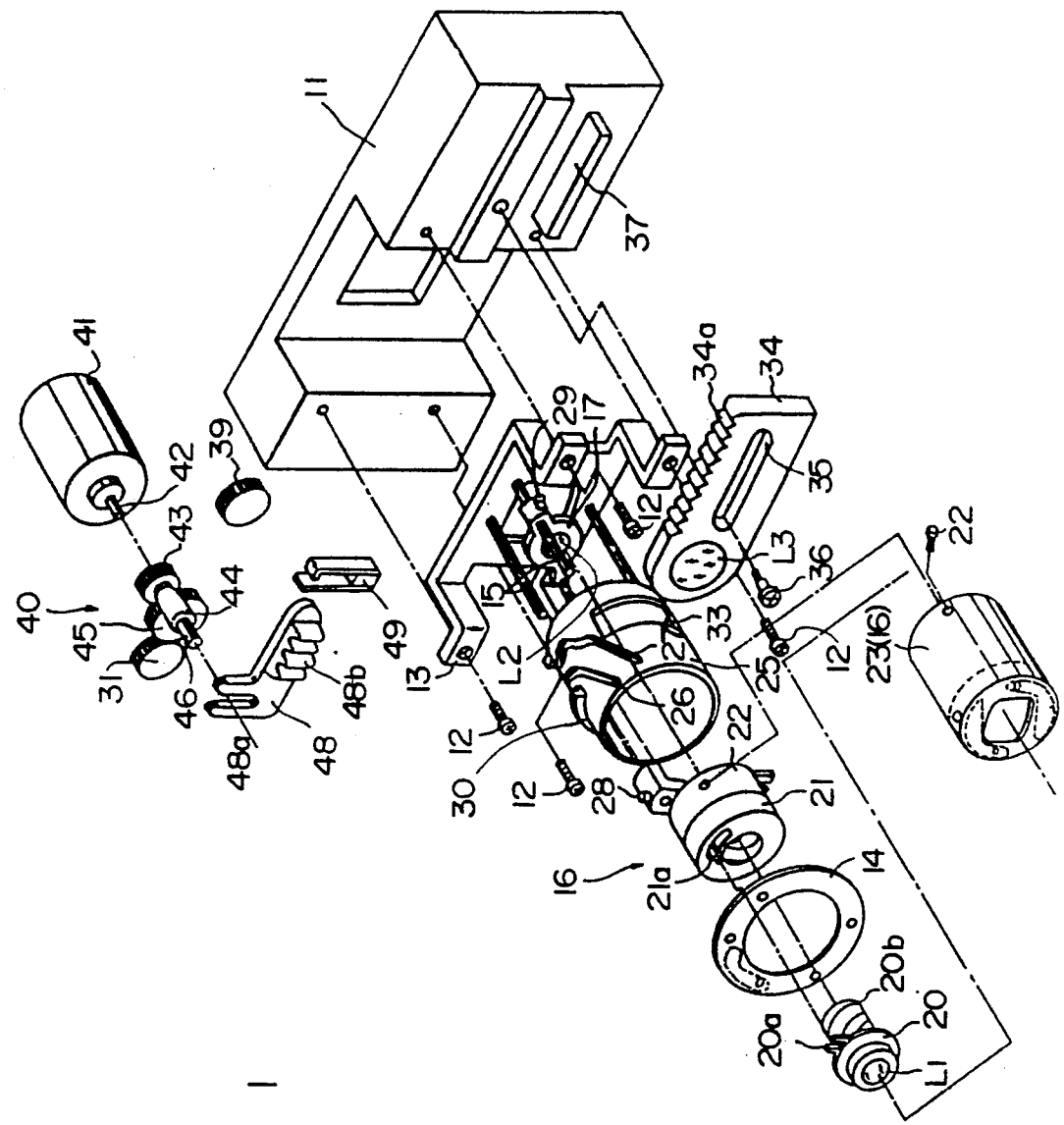
FIG. 1 is an exploded perspective view of a zoom lens camera having a converter lens incorporated therein, according to an embodiment of the present invention.

A camera body 11 is provided with a rear securing plate 13 which is secured thereto by set screws 12. Between the rear securing plate 13 and a front securing plate 14 are secured guide rods 15 which extend in parallel with the optical axis of the camera to slidably guide a front lens block 16 holding a front lens group L1 and a rear lens frame 17 holding a rear lens group L2 therealong.

The front lens block 16 has a front lens frame 20 to which the front lens group L1 is secured, a shutter block 21 having a center helicoid which is engaged by a helicoid 20b of the front lens frame 20, a base block 22 to which the shutter block 21 is secured and which is slidably fitted on the guide rods 15, and a decoration frame 23 which is secured to the base block 22 by set screws 22a. The front lens frame 20 has a radially projecting association arm 20a secured thereto, which is engaged by a lens feed lever 21a of the shutter block 21. The shutter block 21 rotates the lens feed lever 21a by a predetermined angular displacement which is determined in accordance with an object distance signal issued by an object distance measuring device (not shown). The rotation of the lens feed lever 21a is transmitted to the front lens frame 20 through the association arm 20a thereof, so that the front lens group L1 can be moved to a predetermined focal point in accordance with the helicoid 20b.

A cam ring 25 is rotatably supported between the front securing plate 13 and the rear securing plate 14. The cam ring 25 has a zooming cam groove 26 (which will be referred to as a front zooming cam groove hereinafter) for the front lens group L1 and a zooming cam groove 27 (which will be referred to as a rear zooming cam groove) for the rear lens group L2. A roller 28 which is provided on the base block 22 of the front lens block 16 and a roller 29 which is provided on the rear lens frame 17 are fitted in the front and rear zooming cam grooves 26 and 27, respectively.

The cam ring 25 is provided, on its outer periphery, with a sector gear 30 secured thereto by set screws 30a. The sector gear 30 is in mesh with a pinion (cam ring pinion) 31, as shown in FIGS. 3A and 3B.

The cam ring 25 has a converter lens insertion hole (opening) 33 which is formed in the annular wall thereof in the circumferential direction. The camera body 11 linearly and slidably supports a converter lens frame 34 which can be inserted in the converter lens insertion hole 33 when the cam ring 25 stops at a longest focal length (tele extremity). Namely, the converter lens frame 34 has a linear movement guide groove 35 in which a guide pin 36 secured to the camera body 11 is fitted. The camera body 11 has a guide projection 37 formed thereon for guiding the movement of the converter lens frame 34, so that the converter lens frame 34 can slide in directions perpendicular to the axis of the cam ring 25, i.e. the optical axis of the zoom photographing optical system. The converter lens frame 34 has a converter lens L3 at the front end thereof close to the cam ring 25. The converter lens L3 is for example a tele converter lens having a magnification of 1.5x. The position of the converter lens insertion hole 33 formed in the cam ring 25 coincides with the converter lens frame 34 when the cam ring 25 rotates to come to the tele extremity, as shown in FIG. 2B.

Figure 3A:
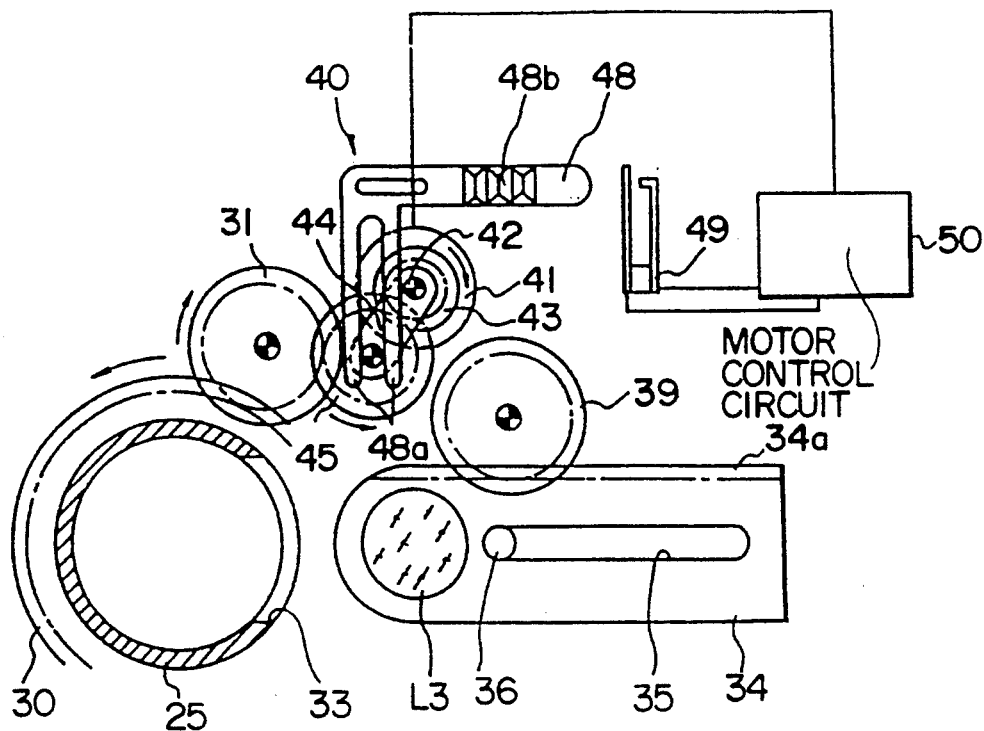
Figure 3B:
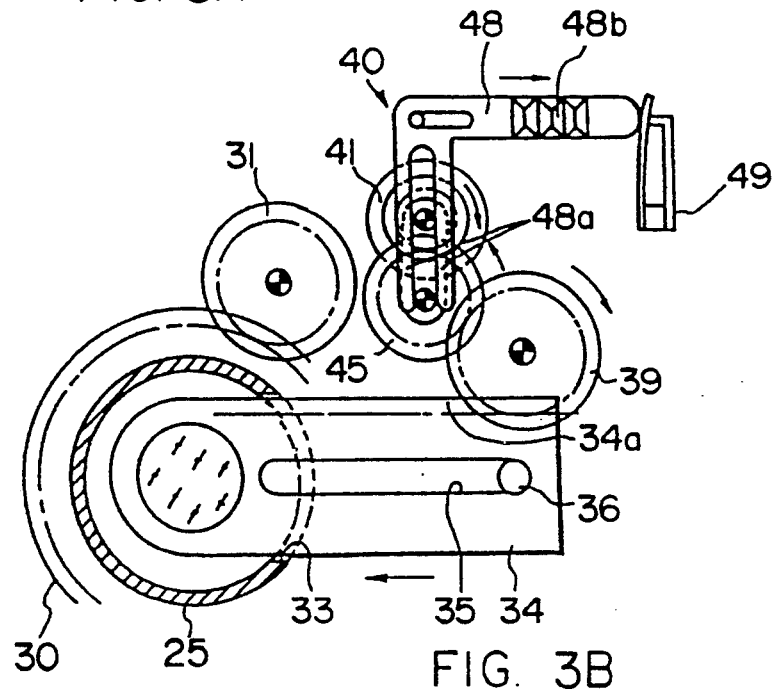

The converter lens frame 34 is provided on its upper end with a rack 34a which extends in the direction of the movement of the converter lens frame 34, so that the rack 34a is engaged by a pinion (converter pinion) 39, as shown in FIGS. 3A and 3B.

The converter pinion 39 and the cam ring pinion 31 on the side of the cam ring 25 are driven to rotate by a single motor 41 through a switching mechanism 40. The drive motor 41 has an output shaft 42 having a pinion 43 secured thereto and supports a swing arm 44 which is coaxial to the output shaft 42. The front end of the swing arm 44 rotatably supports a switching pinion 45 which is always in mesh with the pinion 43 through a shaft 46. The shaft 46 is engaged in a bifurcated portion 48a of the switching slide switch 48, so that when the slide switch 48 slides, the switching pinion 45 can be selectively engaged by the pinion 31 or 39.

A converter detecting switch 49, when pushed down by the slide switch 48, detects that the switching pinion 45 engages with the pinion 39. In this position, the converter photographing can be performed. A mechanical stopping device (not shown) is provided which allows the slide switch 48 to move in the right hand direction in FIGS. 3A and 3B only when the cam ring 25 rotates to the tele extremity and otherwise prevents the movement of the slide switch in the right hand direction. Numeral 48b in FIGS. 1, 3A and 3B designates finger projections of the slide switch 48 which can be touched by a finger of an operator when the slide switch 48 is actuated.

The zoom lens camera according to the present invention operates as follows.

When the slide switch 48 of the switching mechanism 40 is in the zooming position (inoperative position) shown in FIG. 3A, the cam ring pinion 31 is rotated by the rotation of the drive motor 41 to rotate the cam ring 25 through the sector gear 30. As a result, the front lens group L1 and the rear lens group L2 are moved in the optical axis direction while keeping a predetermined relationship in accordance with the profiles of the zooming cam grooves 26 and 27 to effect the zooming operation.

On the other hand, when the converter photographing mode is selected by a mode selection switch (not shown), the drive motor 41 is driven by a motor control circuit 50 (FIG. 3A) connected to the drive motor 41 to move the cam ring 25 to the tele extremity. When the cam ring 25 is rotated to the tele extremity, the converter lens insertion hole 33 of the cam ring 25 comes to the position of the converter lens frame 34. In this position, the slide switch 48 is moved from the zoom position (normal photographing position) shown in FIG. 3A to the converter photographing position (operative position) shown in FIG. 3B. The slide movement is manually effected in the illustrated embodiment. Alternatively, it is possible to electromagnetically effect the slide movement. By the slide movement, the bifuracated portion 48a of the slide switch 48 causes the switching pinion 45 to come into engagement with the converter pinion 39, so that the converter detecting switch 49 is made ON. As a result, the drive motor 41 is driven by the motor control circuit 50 to rotate the converter pinion 39 through the pinion 43 and the switching pinion 45. The rotation of the pinion 39 is transmitted to the converter lens frame 34 through the rack 34a, so that the linear movement of the converter lens frame 34 takes place. The converter lens frame 34 enters the cam ring 25 through the converter lens insertion hole 33 to move the converter lens L3 to the center of the cam ring 25, i.e. onto the optical axis of the zoom photographing optical system. Consequently, the focal length at the zooming tele extremity is converted to a longer focal length in accordance with the magnification of the converter lens L3 (FIG. 2B).

Figure 2A:
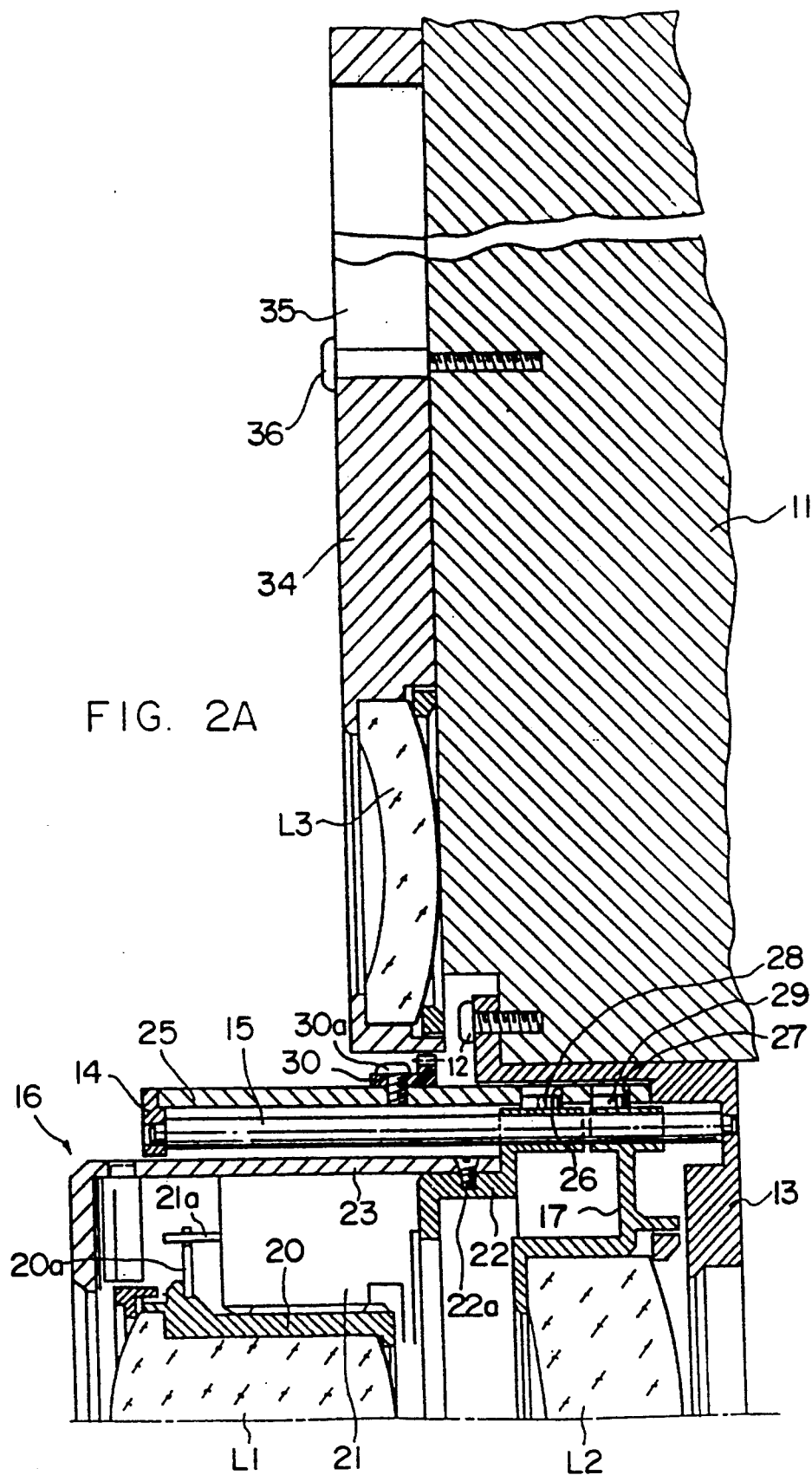
FIGS. 2A and 2B are sectional views of a converter lens shown in an inoperative position (zoom photographing position) in which the converter lens is located out of a zoom photographing optical system and in an operative position (converter photographing position) in which the converter lens is located within the zoom photographing optical system, respectively; and, FIGS. 3A and 3B are front elevational views of a drive system in a zoom lens camera of the invention, corresponding to FIGS. 2A and 2B, respectively.
Figure 2B:
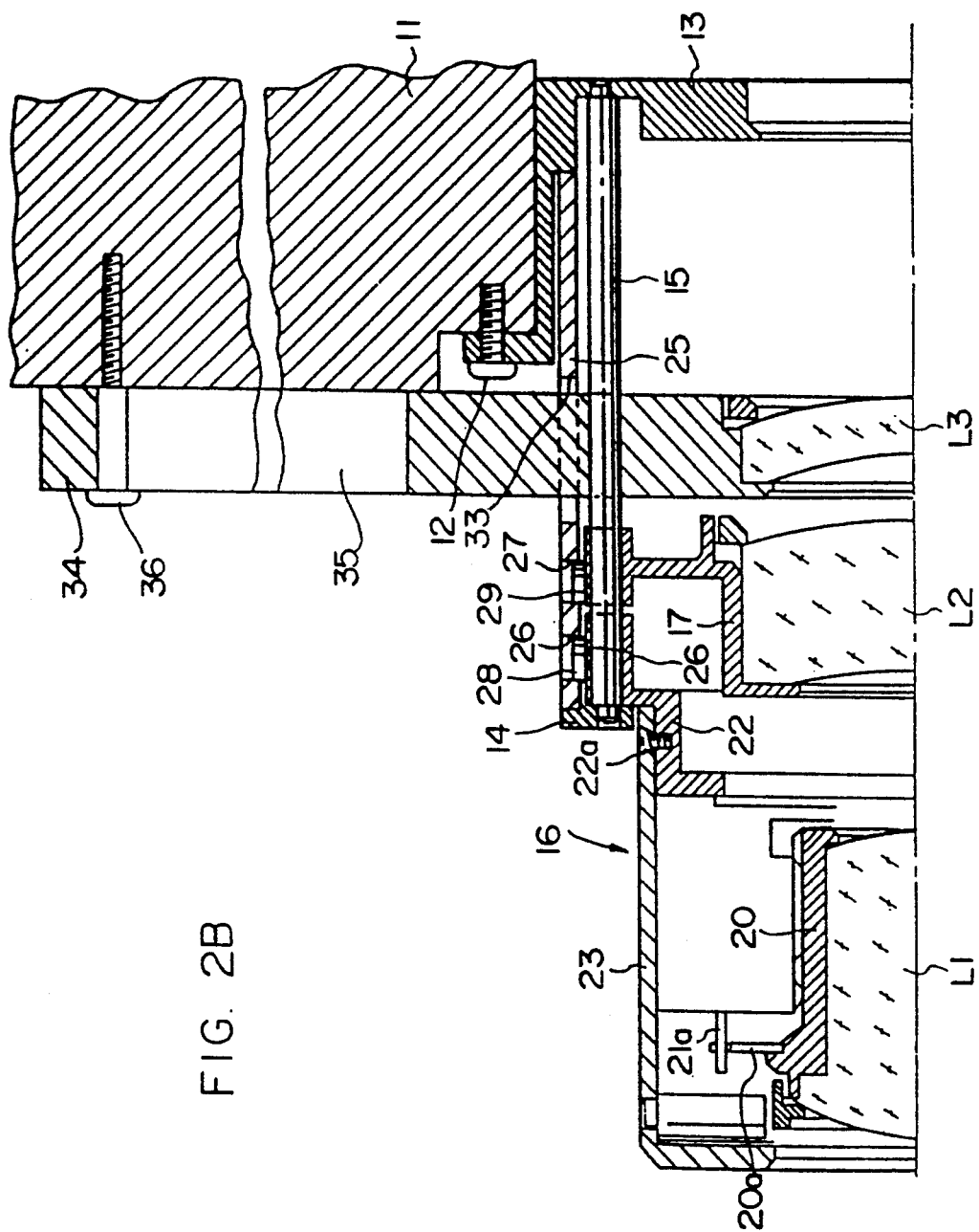

Upon the completion of the converter photographing, the normal photographing mode is selected by the mode selection switch (not shown), so that the drive motor 41 rotates in the reverse direction by a predetermined angular displacement (the number of revolution) through the motor control circuit 50 to retract the converter lens frame 34 from the cam ring 25, so that the converter lens frame 34 is returned to the initial position shown in FIGS. 3A and 2A. After that, the slide switch 48 of the switching mechanism 40 is moved in the left hand direction in FIG. 3B, so that the switching pinion 45 comes into engagement with the pinion 31. As a result, the zooming operation can be effected by the rotation of the drive motor 41.

Although, in the illustrated embodiment, the zoom photographing optical system comprises the front lens group L1 and the rear lens group L2, the construction of the zoom photographing optical system is not limited thereto.

As can be seen from the foregoing, according to the present invention, a useful zoom lens camera having a converter lens incorporated therein can be realized.

I claim:

1. A zoom lens camera including at least one variable power lens group moved in an optical axis direction of a zoom photographing optical system by a rotatable cam ring to vary the focal length of said zoom lens camera, comprising:

a converter lens adapted to vary the focal length of the zoom photographing optical system, said cam ring including a converter lens insertion hole through which the converter lens can be inserted into the optical axis of the zoom photographing optical system when the cam ring stops at a specific position;

a converter lens frame, which is linearly movably supported by a camera body; and a drive motor including an output shaft having a pinion secured thereto, wherein said converter lens frame includes a rack adapted to engage said pinion.

2. A zoom lens camera according to claim 1, wherein said converter lens is a rear tele converter lens which moves into and out of the optical axis of the zoom lens photographing system behind said at least one variable power lens group at a longest focal length when said variable power lens is located in a most advanced position.

3. A zoom lens camera according to claim 1, wherein said converter lens is a rear wide converter lens which moves into and out of the optical axis of the zoom lens photographing system behind said variable power lens group at a shortest focal length when said variable power lens group is located in a most advanced position.

4. A zoom lens camera according to claim 1, further comprising switching means for selectively connecting said drive motor to said cam ring or to said converter lens frame.

5. A zoom lens camera according to claim 4, wherein said switching means comprises a swingable arm coaxial to the output shaft of the drive motor.

6. A zoom lens camera wherein variable power lens groups are moved by a rotatable cam ring in an optical axis direction of a zooming photographing optical system to vary the focal length of said system, comprising;
a gear formed on the outer periphery of the cam ring and adapted to be engaged by a cam ring pinion to rotate the cam ring, a converter lens insertion hole provided on the cam ring, a converter lens frame adapted to support a converter lens for varying the focal length of the zoom photographing optical system, said converter lens frame being movable in directions perpendicular to the optical axis of the zoom photographing optical system, a rack provided on the converter lens frame extending in the direction of the movement of said frame, a converter pinion which is engaged by the rack, a drive for rotating the cam ring and the converter lens frame, and a switching mechanism for selectively transmitting a drive force of the drive to the cam ring pinion or the converter pinion.

* * * * *